US010421583B2

(12) United States Patent
Targoff

(10) Patent No.: US 10,421,583 B2
(45) Date of Patent: Sep. 24, 2019

(54) SEPARABLE CONTAINER FOR FROZEN DESSERT PRODUCT

(71) Applicant: Zachary Targoff, New York, NY (US)

(72) Inventor: Zachary Targoff, New York, NY (US)

( * ) Notice: Subject to any disclaimer, the term of this patent is extended or adjusted under 35 U.S.C. 154(b) by 226 days.

(21) Appl. No.: 15/587,007

(22) Filed: May 4, 2017

(65) Prior Publication Data

US 2018/0319542 A1 Nov. 8, 2018

(51) Int. Cl.
| | |
|---|---|
| B65D 25/08 | (2006.01) |
| A23G 9/28 | (2006.01) |
| B65B 25/00 | (2006.01) |
| B65B 61/20 | (2006.01) |
| B65D 3/04 | (2006.01) |
| B65D 3/24 | (2006.01) |
| B65D 3/26 | (2006.01) |
| B65D 85/78 | (2006.01) |

(52) U.S. Cl.
CPC .............. *B65D 25/08* (2013.01); *A23G 9/283* (2013.01); *B65B 25/007* (2013.01); *B65B 61/207* (2013.01); *B65D 3/04* (2013.01); *B65D 3/24* (2013.01); *B65D 3/262* (2013.01); *B65D 85/78* (2013.01)

(58) Field of Classification Search
CPC ........ B65D 25/08; B65D 43/02; B65D 85/60; B65D 3/04; B65D 3/24; B65D 3/262; B65D 85/78; B65B 5/10; B65B 7/28; B65B 25/007; B65B 61/207
USPC .......................................................... 53/410
See application file for complete search history.

(56) References Cited

U.S. PATENT DOCUMENTS

| | | | |
|---|---|---|---|
| 1,186,391 A | 6/1916 | Gary | |
| 1,552,997 A | 9/1925 | Marczak | |
| 1,598,951 A | 9/1926 | Wright | |
| 1,815,800 A | 7/1931 | Respess | |
| 1,904,741 A | 4/1933 | Lorber | |
| 2,514,573 A | 7/1950 | Harrison | |
| 2,582,655 A | 1/1952 | Schenk | |
| 2,595,113 A | 4/1952 | Taberer | |
| 2,662,017 A | 12/1953 | Winters | |
| 2,969,902 A | 1/1961 | Cage | |
| 3,137,437 A | 6/1964 | Svensson | |
| 3,144,152 A * | 8/1964 | Kopp | A47J 47/04 |
| | | | 215/6 |
| 3,236,369 A | 2/1966 | Moore | |
| 3,343,746 A | 9/1967 | Shiffman | |
| 3,967,773 A | 7/1976 | Kaufmann | |

(Continued)

*Primary Examiner* — Sameh Tawfik

(74) *Attorney, Agent, or Firm* — Leason Ellis LLP

(57) ABSTRACT

A separable container and related method for delivering predetermined portions of product contained within a container is provided. The container has a sidewall having a plurality of frangible sections disposed at predetermined distances along the height of the sidewall. A plurality of flexible dividers are interspersed with the product in the container, each of the flexible dividers being substantially aligned with a respective frangible section of the sidewall. Sidewall segments are separable from the container to expose a predetermined portion of the product contained therein, and the flexible dividers define a boundary between adjacent predetermined portions of product to facilitate separation of the exposed predetermined product portions from a remainder of product seated within the container sidewall.

10 Claims, 3 Drawing Sheets

(56) References Cited

U.S. PATENT DOCUMENTS

| | | | |
|---|---|---|---|
| 3,991,168 A | | 11/1976 | Richards et al. |
| 4,091,929 A | * | 5/1978 | Krane .................... B65D 3/263 |
| | | | 229/101.1 |
| 4,349,110 A | | 9/1982 | Hayashi |
| 4,598,832 A | * | 7/1986 | Alonso ............... A47J 41/0083 |
| | | | 215/10 |
| 5,422,129 A | * | 6/1995 | Draddy ................. B65D 21/08 |
| | | | 215/10 |
| 5,626,250 A | * | 5/1997 | Dorazio ............ B65D 75/5888 |
| | | | 220/4.26 |
| D404,822 S | * | 1/1999 | Galustyan .................... D24/197 |
| 5,930,951 A | * | 8/1999 | Wong ........................ A01G 9/02 |
| | | | 47/66.1 |
| 6,092,717 A | * | 7/2000 | Lowry .................... B65D 3/22 |
| | | | 229/120.03 |
| 6,296,885 B1 | | 10/2001 | Robertson |
| 6,799,715 B1 | * | 10/2004 | Bennett ............. B65D 75/5888 |
| | | | 229/101.1 |
| 7,571,829 B2 | * | 8/2009 | Gersovitz .......... B65D 21/0227 |
| | | | 220/4.06 |
| 8,205,769 B1 | | 6/2012 | Gaspari et al. |
| 8,282,301 B2 | * | 10/2012 | Larsen .................... A47K 7/02 |
| | | | 15/104.93 |
| 9,340,351 B2 | * | 5/2016 | Conlon ............. B65D 75/5844 |
| 2004/0129600 A1 | | 7/2004 | Gueret |
| 2005/0249849 A1 | | 11/2005 | Nelson et al. |
| 2010/0147931 A1 | * | 6/2010 | Kigar .................... B65D 3/262 |
| | | | 229/101.1 |

\* cited by examiner

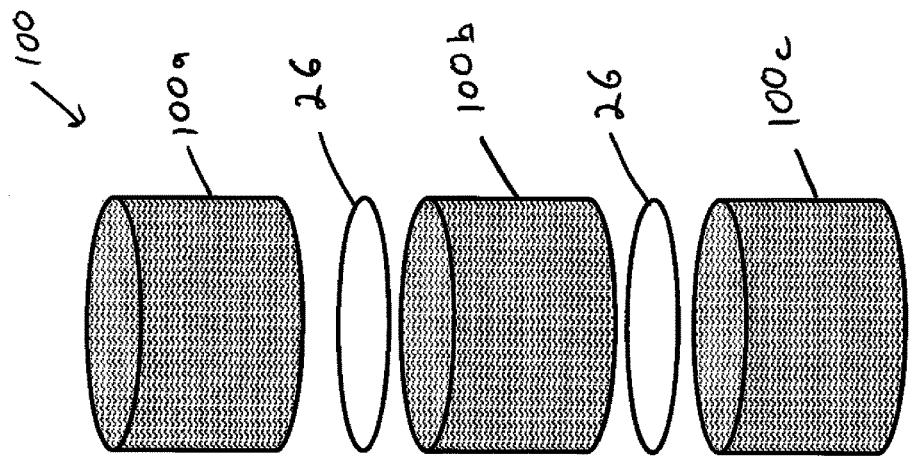
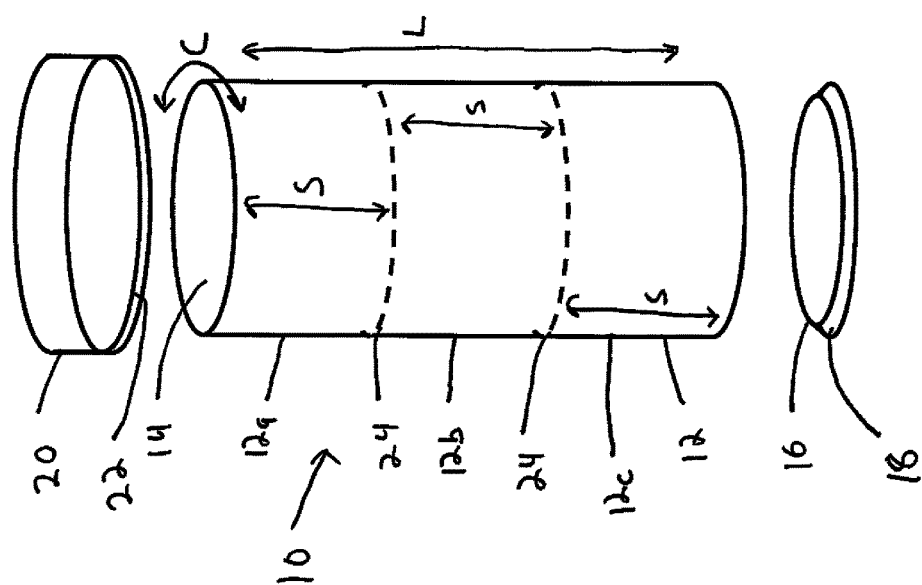
Fig. 1

SEPARABLE CONTAINER FOR FROZEN DESSERT PRODUCT

TECHNICAL FIELD

A system, method, and device for providing a separable container and, in particular, a separable container that can be separated to expose, for removal, a predetermined portion of product contained therein.

BACKGROUND OF THE INVENTION

Typical product containers, for example, frozen dessert containers for products such as ice cream, frozen yogurt, sorbets, non-dairy ice cream alternative and the like, are generally cylindrically shaped containers that have a removable lid. When a consumer wishes to access the frozen dessert, the lid is removed and the product is scooped from the container using a scooping device, such as an ice cream scoop, ice cream paddle, or spoon, to scoop out the frozen dessert. However, this traditional method has several draw backs. One drawback is that the frozen dessert is often difficult to remove using a scooping device, requiring substantial force to separate the product, which can also be a messy procedure.

Another drawback to this traditional container and system is that it is often difficult to determine the amount of frozen dessert being removed from the container. Frozen dessert containers are often required (e.g., under U.S. law) to define a portion size and provide nutritional information based on that portion size. For many, such as those following restricted diets, those who may have set nutritional requirements, or those who wish to be conscious of their consumption, it is important to know the amount of product being portioned out. It is extremely difficult to remove only a set portion amount using the scoop method. A user would typically be required to remove product and then take a separate step to measure the removed product by either measuring its volume (e.g., using a measuring cup) or its weight (e.g., using a kitchen scale). A further drawback is that after the product is removed, the cover is then replaced on the partially emptied container, which leaves a void of air space in the container where the product that was removed used to fill. The air that now occupies the void within the container can lead to spoilage of the product remaining in the container (e.g., through oxidation) and/or it can lead to an increased prevalence of freezer burn of the product.

Certain developments have been made in the container art that have attempted to solve some of these problems. For example, some have attempted to solve the problem of the air void by providing an ice cream container that has removable sections. Accordingly, after the ice cream is removed from the container via a traditional scooping method, a section of the wall of the container can be removed so that when the cover is replaced, the size of the void is allegedly reduced. However, this system has several drawbacks. Since the product is removed by scooping, this is still a difficult, manual process that does not ensure a set portion amount is removed. In addition, since the amount of product being removed is not controlled, it is possible that the remaining level of product in the container will be in between the separation points in the container. As such, when the user removes a section of the container, there can still be a void between the cover and the product in the container. On the other hand, there is a risk that the user can misidentify the closest separation point in the container and, upon separation of the container section, discover that the product level now extends above the container wall, which can prevent the cover from properly engaging the container sidewall.

Others have attempted to solve the problem of removing the ice cream for the container using a string device or by cutting with a knife. It has been proposed to provide containers in which a string device extends along the central access of container and is disposed through the ice cream. The string can then allegedly be pulled in a circular motion to cut a portion of ice cream. However, since the ice cream is frozen it is likely very difficult to pull a string through the frozen product. Moreover, since the string is located in the center of the ice cream, it would be difficult to maintain the string horizontally during the circular cutting motion. If the user does not pull hard enough, the cut section of ice cream will likely have a concave underside due to the fact that the center of the string was not pulled into alignment with the outer circumference of the container. Conversely, if the string was pulled too hard, the cut section of ice cream would likely have a convex shape due to string alignment issues. Not only do these problems prevent a user from providing a consistent, predictable portion size, the shape of the remaining ice cream in the container (protruding/recessed) can interfere with the seating of the lid or provide an air void. Moreover, if the ice cream includes solid mix-ins (e.g., nuts, chocolate chunks, etc.), the solid mix-in can be suspended within the frozen ice cream at a desired cut location, which could prevent the user from being able to move the string in the circular motion, can result in breakage of the string, and/or cause the string to move up or down around the solid piece, thereby preventing a controlled cut. Cutting ice cream with a knife can be a messy procedure, can create a cut danger to the user, and present a portion control issue since the knife can unintentionally cut through a portion of the container in an uncontrolled manner, thereby making portion control difficult.

Certain examples of prior devices concerning containers include: U.S. Pat. No. 6,799,715 to Bennet et al.; U.S. Pat. No. 3,967,773 to Kaufmann; and U.S. Patent App. Pub. No. 2010/0147931.

The present invention solves these and other problems.

SUMMARY

According to one aspect of the invention, a separable container for providing predetermined portions of product contained therein is provided. The container includes a sidewall extending in a first direction to define a height of the container and extending in a second direction to define an outer periphery. The sidewall defines an interior space for containing the product within the container. The sidewall has a plurality frangible sections disposed at predetermined distances along the height of the sidewall and a plurality of sidewall segments are defined adjacent each frangible section. The container includes an end wall disposed at one end of the sidewall. The end wall engages with the sidewall and has sufficient structural integrity to prevent inadvertent release of the product contained within the container. The container includes a plurality of flexible dividers interspersed with the product in the container and each of the plurality of flexible dividers are substantially aligned with a respective frangible section of the sidewall. A cover is sized and shaped to engage with the sidewall of the container. The container provides for each sidewall segment being separable from a remainder of the sidewall at each of the frangible sections to expose a predetermined portion of the product contained therein that extends above the remainder of the sidewall. Each of the flexible dividers defines a boundary between adjacent predetermined portions of product and facilitates separation of the exposed predetermined portion of product from a remainder of product contained within the container. The cover is securely engageable with a remainder of the sidewall upon separation of a segment of the sidewall.

According to a further aspect, the plurality of flexible dividers each has a first and second surface, wherein the first and second surfaces have different surface textures.

According to a yet further aspect, the first surface has a rougher surface texture as compared to the second surface, and wherein the first surface is oriented toward the end wall.

According to a yet further aspect, the first surface has a rougher surface texture as compared to the second surface, and wherein the first surface is oriented away from the end wall.

According to a further aspect, the plurality of flexible dividers is equal to one less the number of the plurality of predetermined portions.

According to another yet further aspect, the sidewall defines a substantially cylindrical shape.

According to another aspect of the present invention, a method for providing predetermined portions of product is provided. The method includes the step of providing a container. The container includes a sidewall extending in a first direction to define a height of the container and extending in a second direction to define an outer periphery. An interior space is defined for containing the product within the container. The sidewall has a plurality frangible sections disposed at predetermined distances along the height of the sidewall and a plurality of sidewall segments defined adjacent each frangible section. The container includes an end wall disposed at one end of the sidewall, the end wall engaging with the sidewall and having sufficient structural integrity to prevent inadvertent release of the product contained within the container. A plurality of flexible dividers are interspersed with the product in the container, each of the plurality of flexible dividers being substantially aligned with a respective frangible section of the sidewall. A cover is sized and shaped to engage with the sidewall. The method further includes the steps of disengaging the cover from the sidewall and separating a sidewall segment from a remainder of the sidewall along one of the plurality of frangible sections. A predetermined portion of product is exposed by removing the separated sidewall segment. The exposed, predetermined portion of product is removed along a boundary defined by a respective flexible divider. The cover is reengaged with the remainder of the sidewall.

According to a further aspect, the steps of separating and exposing occur concurrently.

According to another aspect of the present invention, a method for filling a container having predetermined portions of product is provided. The method includes the step of providing a container. The container includes a sidewall extending in a first direction to define a height of the container and extending in a second direction to define an outer periphery. An interior space is defined for containing the product within the container. The sidewall has a plurality frangible sections disposed at predetermined distances along the height of the sidewall and a plurality of sidewall segments defined adjacent each frangible section. The container includes an end wall disposed at one end of the sidewall, the end wall engaging with the sidewall and having sufficient structural integrity to prevent inadvertent release of the product contained within the container. The method includes the step of depositing a predetermined portion of product into the container, wherein the predetermined product portion aligns with one of frangible sections. A flexible divider is inserted into the container. The method includes successively depositing further predetermined portions of product and respectively inserting flexible dividers into the container therebetween until the container is full and each flexible divider is aligned with a respective frangible section. A cover is engaged with the sidewall of the container.

According to a further aspect, each predetermined portion of product is deposited in a semi-frozen state.

According to another further aspect, each predetermined portion of product is deposited in a frozen state, and wherein the predetermined portion of product is sized and shaped to fit within the container and seat in alignment with a respective frangible section.

These and other aspects, features and advantages will be apparent upon consideration of the following description of certain embodiments of the invention in view of the accompanying drawing figures.

BRIEF DESCRIPTION OF THE DRAWINGS

FIG. 1 is an isometric exploded view of a separable container according an embodiment of the invention;

DETAILED DESCRIPTION CERTAIN OF EMBODIMENTS OF THE INVENTION

Figure 2:
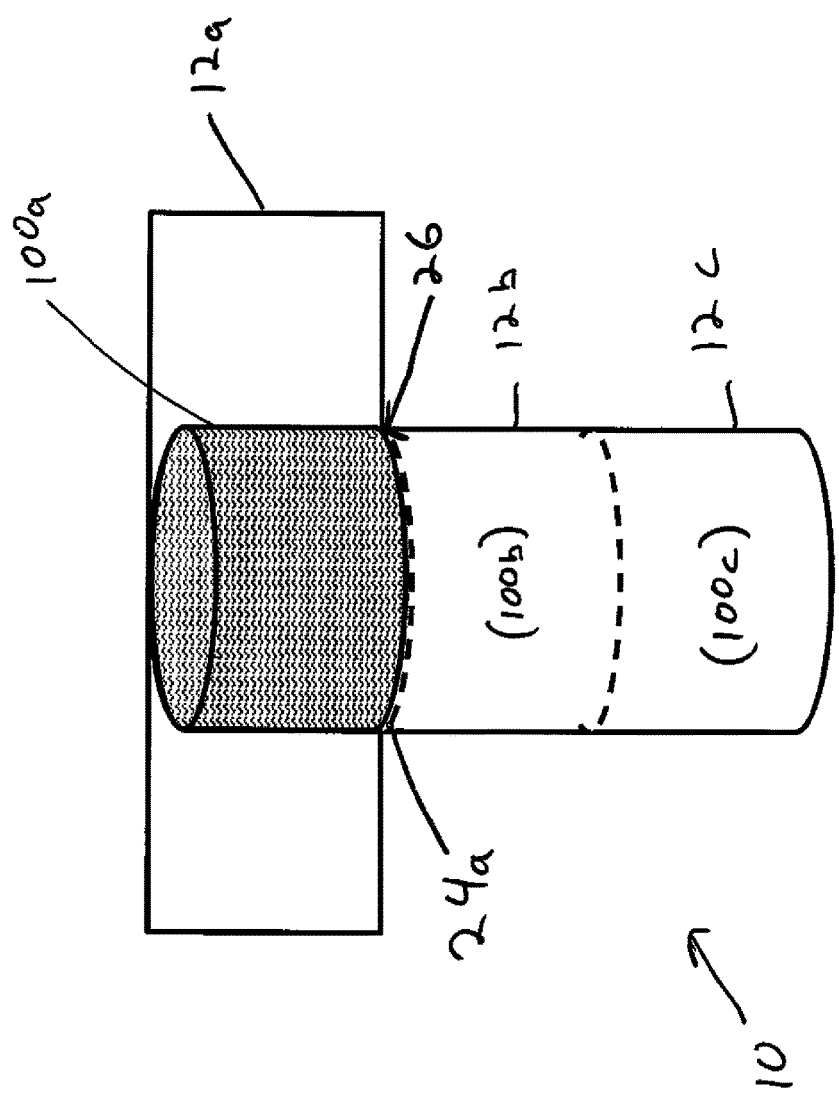
FIG. 2 illustrates a sidewall section removed to expose a product portion thereof.
Figure 3:
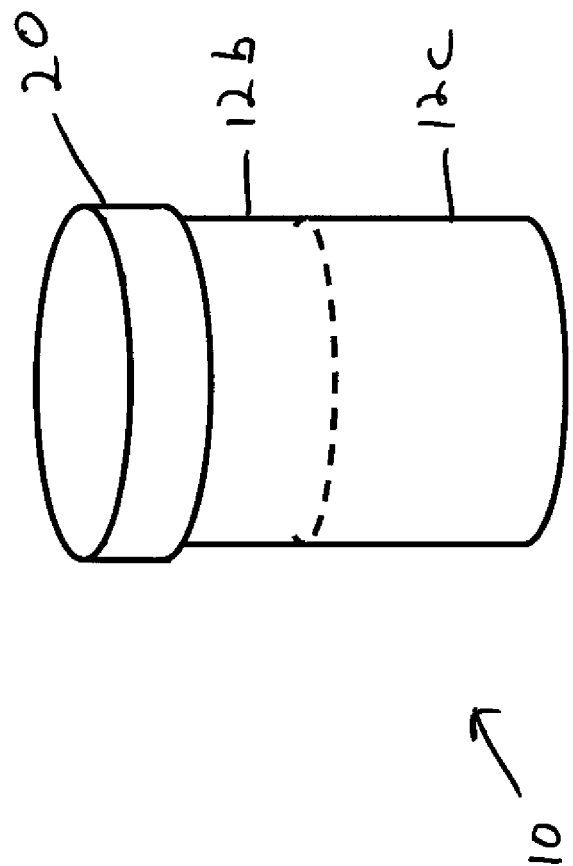
FIG. 3 illustrates a cover replaced on the container after a sidewall section has been removed.

Referring to FIGS. 1-3, a separable container 10 for providing predetermined portions of a product 100 contained therein is provided. The separable container 10 includes a sidewall 12. The sidewall 12 extends in a first direction L to define a first height of the container 10. The sidewall 12 extends in a second direction C to define an outer periphery of the container 10. The sidewall 12 defines an interior area 14 that provides a space for housing the product 100.

The container 10 includes an end wall 16 disposed at one end of the container. The end wall 16 engages with the sidewall 12 and defines a boundary to the interior area 14. The engagement between the sidewall 12 and end wall 16 is sufficient to remain engaged through regular use, for example, during packaging, shipping, transportation, storage and consumer use, to prevent inadvertent release of product from the container 10. For example, the end wall 16 can be bonded to the sidewall 12 using materials and methods that are typical in the packaging arts. As one example, the end wall 16 can be bonded to the sidewall 12 using food-safe glue. The end wall 16 can include a lip 18, which can be, for example, a folded down section of end wall, that can provide an increased bonding surface area for engagement between the end wall 16 and the side wall 12. As another example, portions of the end wall 16 and the sidewall 12 can be folded together to provide mechanical engagement between the end wall 16 and the side wall 12.

The container 10 includes a cover 20. The cover 20 is sized and shaped to engage the sidewall 12 at the other end of the container 10 opposite the end wall 16. The cover 20 is structured to engage the sidewall 12 sufficient to remain engaged through regular use, for example, during packaging, shipping, transportation, and storage, to prevent inadvertent release of product 100 from the container 10. However, the cover 20 is configured to be removable so that a user can remove the cover 20 to gain access to the interior area 14 of the container. The cover 20 can include a seal bead 22 that extends inwardly to increase the engagement force between the cover 20 and the sidewall 12. Accordingly, once a sidewall section is removed, the cover 20 can reengage the remaining portion of the sidewall 12, e.g., in a secure manner to resist removal absent a manually applied pulling force, as shown in FIG. 3 and discussed in more detail below. The seal bead 22 can be formed by curling over a portion of the cover material. The bead 22 reduces the inner diameter of the cover 20, which increases the engagement against the sidewall 12. The bead 22 can be compressible so that the cover 20 can be easily removed and replaced by the user, while also maintaining engagement sufficient to prevent it from falling off during typical use of the container.

The sidewall 12 includes a plurality of frangible sections 24 disposed at predetermined distances S along the height of the sidewall 12. The frangible sections 24 divide the sidewall 12 into a plurality of sidewall segments 12a, 12b, and 12c. The sidewall 12 is shown having three segments 12a-12c as one example, whereas the sidewall 12 can have more or less segments as desired. In addition, the distance S between each frangible section 24 can be varied, as discussed in more detail below. The frangible sections 24 are weakened areas in the sidewall 12 that are capable of permitting a user to tear sidewall 12 along a line defined by a respective frangible section 24. For example, the frangible sections 24 can comprise a line of perforations in the sidewall 12 extending about the circumference of the sidewall. As another example, the frangible sections 24 can comprise a groove that is formed in the material that extends about the circumference that allows for easier tearing along the frangible section 24. As a further example, the plurality of sidewall segments 12a-12c can be manufactured as separate sections and bonded together (e.g., using food-safe glue or other suitable methods) to form the sidewall 12, wherein the joints between the segments 12a-12c define the frangible sections 24 and permit later separation by the user. Other suitable methods and means can be used to create the frangible sections 24 in the sidewall 12.

The separable container 10 includes a plurality of flexible dividers 26. The flexible dividers 26 are disposed within the interior area 14 of the container 10 and are interspersed with the product 100. The flexible dividers 26 are disposed within the container 10 in alignment with a respective frangible section 24. The flexible dividers 26 define a boundary between adjacent sections of product 100 so as to divide the product 100 into a plurality of product portions 100a, 100b, and 100c. The flexible dividers 26 can be relatively thin sheets of material that are highly flexible and provide sufficient structural integrity to prevent adjacent portions of the product from penetrating the divider and migrating together. In addition, once a portion of product is removed from the container, thereby exposing one of the flexible dividers 26, the flexible divider 26 has sufficient structural integrity to resist tearing during normal removal of the flexible divider 26. However, the flexible dividers 26 are highly flexible and offer little resistance to bending forces. Accordingly, the flexible dividers 26 offer little to no resistance to separation and removal of the sidewall sections 12a-c and offer little to no resistance to axial movement of the product within the container or to separation of product portions 100a-c from one another. Rather, the flexible dividers 26 promote removal of the product portions 100a-c from the container since they work to prevent adhesion of the product to adjacent product portion pieces.

The flexible divers 26 can be sized and shaped to correspond to the size and shape of the interior area 14 of the sidewall 12. As shown in FIG. 1, the interior area can have a circular cross-section and the flexible dividers 26 can have a corresponding circular, disk shape of relatively thin material. The flexible dividers 26 can be slightly oversized such that when they are inserted into the interior area 14, the edge portions of the flexible dividers 26 bend to partially cup a respective adjacent product portion. An oversize divider can further reduce the chance that adjacent product portions will intermix in the container. As one example, the flexible dividers can be thin, flexible, food-safe sheets of plastic or other suitable materials.

The flexible dividers 26 can be provided with surface texturing to enhance functionality. For example, one side of the flexible divider can be provided with a rough, textured surface. The roughened surface will increase the adhesion between the portion of the product contacting the rough surface. The other side of the flexible divider can have a smooth surface, which will have a lower adhesion as compared to the portion of the product contacting the rough surface. Accordingly, when a portion of product is removed, the flexible divider is more likely to remain in contact with the product portion contacting the rough surface. For example, if an upper surface of the flexible divider is rough and the lower surface is smooth, when the upper product portion is removed, the flexible divider will be removed along with the removed product portion. Removing the flexible divider with the product portion can provide a user greater access to the flexible divider so that it can be more easily separated and discarded. Alternatively, the lower surface can be roughed so that the flexible divider remains in contact with the product that remains in the container. In this way, the flexible divider remains in intimate contact with the exposed edge of the remaining product, which can help preserve the quality of the product during storage. The left behind flexible divider can then be removed when the next portion of product is removed from the container. The flexible dividers 26 can also include tabs or ears that provide additional purchase area for the user to grip and separate the flexible divider from the product.

The sidewall 12, end wall 16, and cover 20 can be made from a typical, food-safe material that is available for packing of foods. For example, a cardboard or bond paper that is coated with a moisture resistant coating can be used. Plastic container materials can also be used. In addition, an additional application of the moisture resistant coating can be applied to the frangible sections 24 (e.g., perforations) in the sidewall to prevent product from leaking through the frangible sections in certain embodiments. In other applications, a removable sealing strip (e.g., a food-safe adhesive strip of tape or other suitable material) can be applied along the frangible sections 24 to further reduce the change of product seepage and/or air penetration. U.S. Pat. No. 4,091,929 to Krane discloses certain moister resistant coatings, which is hereby incorporated by reference in its entirety.

A method of using the container 10 is provided, as one example. The user can disengage the cover 20 from the sidewall 12 of the container. The top most frangible section 24a can then be used to break or tear the sidewall 12 along a line defined by the frangible section 24a to separate the top most sidewall section 12a from the remainder of the sidewall 12. As on example, the user can apply pressure (e.g., using a finger or other instrument) along the frangible section 24a to separate the sidewall. The separated sidewall section can then be removed from the container as a ring. As another example, the sidewall section can be torn or broken along its height until the frangible section 24*a* is reached and then the sidewall section can be torn or broken along the frangible section 24*a* so as to remove the sidewall section as a strip, as shown in FIG. 2. In certain embodiments, a frangible joint can be provided along the height direction of the sidewall to assist in tearing downwardly until the frangible section 24 is reached for easing a peel and strip-type removal process of the sidewall sections 12*a*-12*c*.

As shown in FIG. 2, once the sidewall section 12*a* is separated, a top most product portion 100*a* is exposed. The separation of the sidewall section and exposure of the product portion can occur concurrently, for example, by using the peel and strip-type remove process. The sidewall section 12*a* can be discarded. The exposed product portion 100*a* can be separated from the remainder of the product 100 (portions 100*b* and 100*c*) in the container. A flexible divider 26 is disposed between exposed product portion 100*a* and adjacent product portion 100*b* still within the container. The flexible divider 26 is disposed within the container so that it is aligned with the frangible section 24*a*. Since the flexible divider 26 reduces the chance for product portions 100*a* and 100*b* to adhere together, the product portion 100*a* can be easily removed from the container. For example, a user can apply a force to the product portion 100*a* by applying a side loading, twisting motion, and/or bending loading to the exposed production portion, which will disengage the entire prescribed product portion 100*a* in one action. This is a more efficient and precise way to remove a predetermined portion (amount) of the product as compared to repeated scooping motions or slicing methods, which can be dangerous and inaccurate.

If a user desires more than one serving portion, a further frangible section can be used to expose further predetermined product portions. The sidewall can be manufactured so as to vary the number and distance between respective frangible sections 24 so that, for example, smaller (e.g., half portions) or larger (e.g., double portions) predetermined product portions sized, or combinations thereof, can be provided. The respective sidewall segments can include indicia concerning the respective predetermined product portion it surrounds, such as, for example, volume, weight, portion size, etc. of the corresponding predetermined product portion.

In addition, since the frangible section 24*a* and flexible divider 26 are co-located at the same predetermined height locations along the sidewall, the product portion 100*a* has a predetermined size, which can correspond to a recommend portion size as indicated on a nutrition label, for example. Once the exposed product portion 100*a* has been removed, the cover 20 can be reengaged with the remaining portion of the sidewall 12, as shown in FIG. 3. Since the remaining production portion 100*b* is approximately aligned with the outer edge of the remaining sidewall, the replaced cover 20 is in close proximity to the outer surface of the remaining product portion 100*b*, which reduces air void contact and helps protect against freezer burn.

A method of filling the container 10 is provided, as one example. A container 10 having a sidewall 12 and end wall 16 engaged at one end thereof is provided. A predetermined volume of product is deposited through the other, open end of the sidewall 12 into the interior area 14. For example, the product can be dispensed in a semi-frozen or liquid state from an overhead drop deposit unit, which can be of the type of typical equipment used on an ice cream/frozen dessert packaging assembly line. The volume of product deposited is predetermined so that when the product is in the container, the top surface will align with a first frangible section 24 adjacent the closed end of the container. A flexible divider 26 is then inserted into the container. A next predetermined volume of product is deposited into the container. By inserting the flexible divider 26 between successive, predetermined product portions, the flexible divider 26 is in contact with adjacent product portions and defines a boundary therebetween. The flexible divider is in alignment with the first frangible section 24 by virtue of the top surface of the first product portion being aligned with the first frangible section. This process can be repeated until the container is filled with adjacent, further predetermined production portions with respective flexible dividers disposed therebetween and in alignment with respective frangible sections in the sidewall. After the last predetermined product portion is deposited into the container, the cover 20 can be applied so as to engage with the sidewall of the container and cover the open end of the container.

As an alternative method of filling the container, the product portions can be provided as frozen pieces that have a size and shape that corresponds with the interior area 14 of the container such that when they are deposited therein, the frozen product pieces align with the frangible sections 24 in the sidewall. Accordingly, a first frozen product piece can be deposited into the container. A flexible divider can then be inserted to the container and a successive frozen product piece can then be inserted. The flexible divider will be disposed within the container in substantial alignment with the frangible section by virtue of the predetermined, correspondingly sized and shaped frozen product pieces setting the position of the flexible divider within the container. This successive process can be repeated until the container is full, at which point the cover can be applied. As another option, the frozen product portions can be provided with the flexible dividers adhered thereto. Accordingly, depositing a frozen product portion into the container also results in the flexible divider being deposited into the container and aligned with a respective frangible section. As a further option, the predetermined product portions and respective flexible dividers disposed therebetween can be provided in a stacked arrangement. The stacked arrangement can then be inserted into the container in a single step (e.g., by sliding the stacked arrangement into the container or by moving the container over the stacked arrangement). Accordingly, the container can be filled by inserting the stacked arrangement such that each respective flexible divider is co-located with a respective frangible section in the sidewall.

The invention has been described with regard to certain embodiments thereof to aid in an understanding thereof, but the invention itself is more broadly defined by the recitations in any claims appended hereto, and equivalents of such recitations, and the claims are to be read with that in mind.

The invention claimed is:

1. A method for providing predetermined portions of product, comprising the steps of:
   providing a container, the container comprising:
   a sidewall extending in a first direction to define a height of the container and extending in a second direction to define an outer periphery and an interior space for containing the product within the container, the sidewall having a plurality frangible sections disposed at predetermined distances along the height of the sidewall, and the sidewall having a plurality of sidewall segments defined adjacent each frangible section;
   an end wall disposed at one end of the sidewall, the end wall engaging with the sidewall and having sufficient structural integrity to prevent inadvertent release of the product contained within the container;

a plurality of flexible dividers interspersed with the product in the container, each of the plurality of flexible dividers being substantially aligned with a respective frangible section of the sidewall; and a cover sized and shaped to engage with the sidewall; disengaging the cover from the sidewall;

separating a sidewall segment from a remainder of the sidewall along one of the plurality of frangible sections;

exposing, after separating the sidewall segment, a predetermined portion of product by removing the separated sidewall segment and thereby exposing a previously unexposed area of the predetermined portion of product;

after exposing the predetermined portion of product, removing the exposed, predetermined portion of product along a boundary defined by a respective flexible divider; and reengaging the cover with the remainder of the sidewall, after removing the exposed, predetermined portion of product.

2. The method of claim 1, wherein each of the plurality of flexible dividers has a first and second surface, wherein the first and second surfaces have different surface textures.

3. The method of claim 2, wherein the first surface has a rougher surface texture as compared to the second surface, and wherein the first surface is oriented toward the end wall.

4. The method of claim 2, wherein the first surface has a rougher surface texture as compared to the second surface, and wherein the first surface is oriented away from the end wall.

5. The method of claim 1, wherein the plurality of flexible dividers is equal to one less the number of the plurality of predetermined portions.

6. The method of claim 1, wherein the sidewall defines a substantially cylindrical shape.

7. The method of claim 1, wherein steps of separating and exposing occur concurrently.

8. The method of claim 1, further comprising exposing one of the flexible dividers after the step of removing the exposed, predetermined portion of product from the container and before the step of reengaging the cover with the remainder of the sidewall.

9. The method of claim 1, wherein:

each of the plurality of flexible dividers has a first and second surface, the first and second surfaces have different surface textures, the first surface has a rougher surface texture as compared to the second surface, the first surface is oriented away from the end wall and toward the exposed, predetermined portion of product, and the step of removing the exposed, predetermined portion of product along a boundary defined by a respective flexible divider further comprises:

removing the respective flexible divider together with the predetermined portion of product.

10. The method of claim 1, wherein:

each of the plurality of flexible dividers has a first and second surface, the first and second surfaces have different surface textures, the first surface has a rougher surface texture as compared to the second surface, the first surface is oriented toward the end wall and away from the exposed, predetermined portion of product, and the step of removing the exposed, predetermined portion of product along a boundary defined by a respective flexible divider is performed while leaving the flexible divider in intimate contact with an exposed edge of product remaining in the container.

* * * * *